United States Patent [19]

Klisch et al.

[11] 4,064,076
[45] * Dec. 20, 1977

[54] OLEFIN SULFONATE DETERGENT COMPOSITIONS

[75] Inventors: Stephen Cajetan Klisch, Somerset; Charles Andrew Martin, Morris Plains, both of N.J.

[73] Assignee: Colgate-Palmolive, New York, N.Y.

[*] Notice: The portion of the term of this patent subsequent to Sept. 7, 1993, has been disclaimed.

[21] Appl. No.: 622,187

[22] Filed: Oct. 14, 1975

Related U.S. Application Data

[63] Continuation of Ser. No. 349,035, April 9, 1973, abandoned.

[51] Int. Cl.$^2$ .................. C11D 1/14; C11D 1/75; C11D 1/83; C11D 17/08
[52] U.S. Cl. .................. 252/542; 252/153; 252/173; 252/545; 252/547; 252/550; 252/551; 252/552; 252/555; 252/556; 252/DIG. 14

[58] Field of Search ............ 252/524, 528, 532, 536, 252/542, 547, 551, 555, 153, 173, 550, 556, DIG. 14, 545

[56] References Cited

U.S. PATENT DOCUMENTS

| | | | |
|---|---|---|---|
| 3,332,875 | 7/1967 | Kessler | 252/526 |
| 3,332,876 | 7/1967 | Walker | 252/541 |
| 3,428,654 | 2/1969 | Rubinfeld | 252/551 X |
| 3,548,056 | 12/1970 | Eigen | 424/171 |
| 3,640,880 | 2/1972 | Martin | 252/555 |
| 3,793,233 | 2/1974 | Rose | 252/551 X |
| 3,798,183 | 3/1974 | Bruson | 252/557 |
| 3,808,156 | 4/1974 | Gorsich | 252/555 X |
| 3,808,157 | 4/1974 | De Witt | 252/555 |
| 3,915,903 | 10/1975 | Wise | 252/552 |

*Primary Examiner*—Dennis L. Albrecht

[57] ABSTRACT

Liquid detergent compositions are produced containing essentially a mixture of an olefin sulfonate, an alkyl ethoxamer sulfate salt and a tertiary amine oxide foam booster.

9 Claims, No Drawings

OLEFIN SULFONATE DETERGENT COMPOSITIONS

This is a continuation of application Ser. No. 349,035 filed Apr. 9, 1973, now abandoned.

This invention relates to liquid detergent compositions which include an active ingredient mixture of olefin sulfonate and ethoxylated alcohol sulfate and a tertiary amine oxide foam booster proportioned in an aqueous medium. These compositions are generally classed as light duty detergents and are particularly suitable for dishwashing and laundering fine fabrics.

According to one aspect of this invention there is provided a liquid detergent composition containing, dispersed in aqueous medium, a ternary mixture of surfactants containing essentially of a mixture of (a) a sodium alpha olefin sulfonate having an average of about 14 to 16 carbon atoms, (b) an ammonium salt of an alkyl ethoxamer sulfate which is the monosulfate of an ethoxylation product of an alkanol, said alkanol having an average of about 12 to 15 carbon atoms and said ethoxylation product having about 3 ethenoxy groups per alkanol moiety and (c) a tertiary amine oxide having the formula

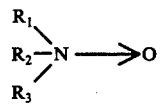

wherein $R_1$ is a higher alkyl group containing 10 to 20 carbon atoms, preferably 12 to 18 carbon atoms, and $R_2$ and $R_3$ each represent a radical selected from the group consisting of alkyl and hydroxyalkyl groups having one to four carbon atoms or $R_2$ and $R_3$ together with the oxygen linked nitrogen

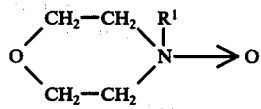

form a heterocyclic morpholino group, e.g., the weight ratio of (a) to (b) being about 1.4:1 to 0.9:1, preferably 1.3:1 to 1.1:1; the weight ratios of (a) and (b) to (c) being about 20:1 to 3:1, preferably about 15:1 to about 3.5:1.

The detergent compositions of this invention have very good performance, such as evidenced, for instance by foaming power, foam characteristics, detergency, biodegradability, storability, low toxicity, desirable viscosity, resistance to gel formation and ready redissolution of any gel formed.

A particularly suitable olefin sulfonate for use in the compositions is the sulfonation product of an olefin mixture containing about 75-85% straight chain alpha olefin (e.g. olefin of the formula $R\text{---}CH\text{=}CH_2$ where R is aliphatic hydrocarbon), about 8 or 10 to 20% olefin in which the unsaturation is in a vinylidene group (e.g. olefin of the formula

where R and R' are aliphatic hydrocarbon groups preferably each having at least four carbon atoms), and about 5 to 12% internal olefin (e.g. olefin of the formula $R\text{---}CH\text{=}CH\text{---}R'$ where R and R' are aliphatic hydrocarbon). One preferred method of preparing such an olefin mixture is by polymerization of ethylene with a Ziegler type catalyst to produce a mixture of alpha-olefins of various chain lengths, separating therefrom a fraction containing principally $C_{14}$ and $C_{16}$ alpha olefins and a fraction containing lower molecular weight alpha olefins (e.g. of 6 and 8 carbon atoms) and dimerizing the latter fraction and combining the first mentioned fraction with said dimerized fraction.

One particularly suitable olefin mixture has an average of about 14 to 15 (e.g. 14.2 to 14.7) carbon atoms. In a most preferred form the olefin mixture has less than 10% (e.g. below 5%, such as 2%) olefins of less than 14 carbon atoms and less than 10% (e.g. below 5%, such as 2%) olefins of more than 16 carbon atoms.

The sulfonation of the olefin may be effected with sulfur trioxide at low partial pressure thereof (e.g. a partial pressure below about 100 mm of mercury, preferably below about 25 mm of mercury). The $SO_3$ may be in gaseous form diluted with an inert diluent (e.g. air) or undiluted (in vacuum), it may also be in liquid form (e.g. in solution in $SO_2$ at low temperature, such as 0° C). The $SO_3$: olefin mol ratio is usually about 1:1 to 1.2:1, preferably less than about 1.12:1, such as about 1.05-1.1:1. The reaction product from the sulfonation may be then mixed with a 10-15% molar excess of aqueous caustic to effect neutralization of the sulfonic acids and heated to effect hydrolysis by ring opening of the sultones present as a major proportion of the reaction product. The resulting product typically contains by weight an amount of alkenyl sulfonate which is within the range of about 40 to 80% (preferably about 50 to 70%), an amount of hydroxyalkane sulfonate which is within the range of about 15 to 70% (preferably 20 to 40%), about 5 to 12% by weight of hydroxy alkane disulfonate and alkene disulfonate and up to about 7% to about 15%, as impurities designated as sodium sulfate, free oil and sodium chloride. Sulfonation processes are described, for instance, in U.S. Pat. No. 3,462,525 issued Aug. 19, 1969 to Levinsky et. al., U.S. Pat. No. 3,428,654 issued Feb. 18, 1969 to Rubinfeld et. al., U.S. Pat. No. 3,420,875 issued Jan. 7, 1969 to DiSalvo et. al., U.S. Pat. No. 3,506,580 issued Apr. 14, 1970 to Rubinfeld et. al., U.S. Pat. No. 3,579,537 issued May 18, 1971 to Rubinfeld et. al., and U.S. Pat. No. 3,524,864 issued Aug. 18, 1970 to Rubinfeld et. al.

It is also within the broader scope of the invention to use other olefins as the raw material, e.g., olefins made by cracking petroleum wax, substantially pure α-olefins made by polymerization of ethylene, and olefins made by dehydration of higher alcohols having the average chain lengths and distributions of molecular weights described above. Also, the average carbon content may be, less preferably, outside the range of about 14-16 carbon atoms, e.g. 12, 13, 17 or 18 carbon atoms. The olefin sulfonate may also be wholly or partially in the form of a water soluble salt other than the sodium salt, such as potassium, ammonium, mono- di- or tri-ethanolammonium salt or mixtures thereof.

The ethoxylated alcohol sulfate may be produced by ethoxylating with ethylene oxide a natural alcohol or a synthetic alcohol produced by Zeigler or Oxo process having from about 12 to 15 carbon atoms, preferably a primary alkanol, and thereafter sulfating this reaction product to form the monosulfuric acid and then neutralizing to form the ammonium monosulfate salt. It is also within the broader scope of the invention to use other salts, e.g. sodium or triethanolammonium salts and ethoxylation products having other degrees of ethoxylation (such as about 1 to 5 mols of ethylene oxide per mol of alkanol).

Typical suitable alkanols have the following distributions of carbon chains: 0.5% $C_{10}$, 33.6% $C_{12}$, 0.6% $C_{13}$, 61.1% $C_{14}$, 0.1% $C_{15}$, 3.6% $C_{16}$ and 0.4% post $C_{16}$; 0.7% $C_{10}$, 39.9% $C_{12}$, 2.5% $C_{13}$, 51.9% $C_{14}$, 1.4% $C_{15}$, 3.4% $C_{16}$ and 0.1% post $C_{16}$; 31.2% $C_{12}$, 1.8% $C_{13}$, 61.2% $C_{14}$, 1.6% $C_{15}$ and 3.6% $C_{16}$; 0.8% $C_{11}$, 18.7% $C_{12}$, 24.2% $C_{13}$, 32.3% $C_{14}$, 20.0% $C_{15}$ and 0.3% $C_{16}$. Such alcohol sulfates have a molecular weight of from 420 to 460, preferably from 430 to 440 e.g. about 435.

It is within the broader scope of the invention to use ethoxylated alcohol sulfates having an average of about 10 to 18 carbon atoms.

The third essential ingredient in the liquid detergent compositions consists of a tertiary amine oxide.

The tertiary amine oxides may be prepared by reacting a tertiary amine or polyethoxylated amine with an aqueous solution of hydrogen peroxide in approximately equal molar amounts in a reactor which provides temperature stability. Preferred commercial tertiary amine oxides include the bis (2-hydroxyethyl) cocoamine oxide (AROMOX C112-W) and bis (2-hydroxyethyl) tallowamine oxide (AROMOX T/12). A preferred commercial morpholino amine oxide is N-cocomorpholine oxide (AROMOX N-CM-W) having the formula

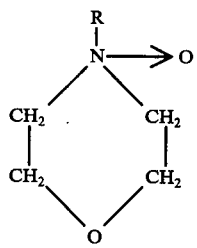

wherein R is cocoalkyl (i.e. $C_8$–$C_{18}$)

The mixture of water-soluble olefin sulfonate and water-soluble ethoxamer sulfate salts generally will be about 18% to 40% by weight of the liquid detergent composition and preferably about 25% to 35% by weight. Concentrations much below 18% are two dilute to achieve the most effective performance unless large amounts are employed and generally have a thinner, more water appearance.

The proportion of tertiary amine oxide in the detergent composition generally will be an amount selected from the range of about 1.5% to about 10%, preferably 2% to 8% by weight which is sufficient to provide improved foam stability or improved foam volume.

The following examples serve to illustrate the inventive detergent compositions. All concentrations in the examples are expressed in percent by weight unless otherwise indicated.

EXAMPLE 1

The following liquid detergent composition is prepared.

| Ingredient | % |
|---|---|
| *Sodium alpha olefin ($C_{14-16}$) sulfonate | 16.1 |
| **Ethoxylated ($C_{12-15}$) alcohol ammonium sulfate | 13.8 |
| Bis-2-hydroxyethyl cocoamine oxide | 4.0 |
| Sodium isethionate | 5.0 |
| Hydroxyethyl ethylenediamine tri-acetic acid-trisodium salt ("Hydroxy E.D.T.A.") | 0.08 |
| Magnesium sulfate heptahydrate | 1.0 |
| ***Water-soluble protein | 1.0 |
| Ethanol | 6.0 |
| Water | Bal. |
| | 100.0 |

*A mixture of from 50% to 70% alkenyl sulfonate, 20% to 40% hydroxyalkane sulfonate and 5% to 12% of hydroxyalkane disulfonate and alkene disulfonate produced by sulfonating a $C_{14-16}$ olefin blend having a carbon distribution of 2.0% max. $C_{12}$, 66.2±2.0% $C_{14}$, 33.4±2.0% $C_{16}$, an average carbon chain length of 14.6, an average molecular weight of 205, a ratio of alpha olefin to vinylidene olefin of 6.4:1 and a ratio of alpha olefin to internal olefins 9.6:1.
*An ethoxylated $C_{12-15}$ alcohol trietrexamer ammonium sulfate having a chain distribution of 0.8% $C_{11}$, 18.7% $C_{12}$, 24.2% $C_{13}$, 32.3% $C_{14}$, 20.0% $C_{15}$ and 0.3% $C_{16}$ and an average molecular weight of 436.
***A partially hydrolyzed collagen protein having an average molecular weight of 1,000.

The olefin sulfonate, water and alcohol are combined and mixed with low speed agitation at room temperature. To this mixture are added in order the formula amounts of bis-2-hydroxy ethyl cocoamine oxide, sodium isethionate, magnesium sulfate, hydroxy EDTA and ethoxylated alcohol ($C_{12-15}$) ammonium sulfate. The ingredients are mixed for about 5 minutes or until the mixture is uniform. The pH of the mixture is adjusted to 7.3±0.3 by the addition of acid or caustic as necessary and then the formula amount of hand care agent is added. Thereafter, color and perfume may also be added if desired. If necessary, the mixture may then be filtered to produce a clear product which may be placed in storage for future use.

EXAMPLE 2

The following liquid detergent composition is prepared as in Example 1.

| Ingredient | % |
|---|---|
| *Sodium alpha olefin ($C_{14-16}$) sulfonate | 16.1 |
| **Ethoxylated ($C_{12-15}$) alcohol ammonium sulfate | 13.8 |
| Bis-2-hydroxyethyl tallow amine oxide | 4.0 |
| Sodium isethionate | 5.0 |
| "Hydroxy E.D.T.A." | 0.08 |
| Magnesium sulfate heptahydrate | 1.0 |
| ***Water-soluble protein | 1.0 |
| Ethanol | 6.0 |
| Water | Bal. |
| | 100.0 |

*, and * - As in Example 1

EXAMPLES 3–7

| Ingredient | % | | | | |
|---|---|---|---|---|---|
| *Sodium alpha olefin ($C_{14-16}$) sulfonate | 16.1 | 16.1 | 16.1 | 16.1 | 16.1 |
| **Ethoxylated ($C_{12-15}$) alcohol ammonium sulfate | 13.8 | 13.8 | 13.8 | 13.8 | 13.8 |
| Bis-2-hydroxyethyl tallow amine oxide | — | — | — | 6.0 | 8.0 |

-continued

| Ingredient | % | | | | |
|---|---|---|---|---|---|
| Bis-2-hydroxyethyl coco amine oxide | 2.0 | 6.0 | 8.0 | — | — |
| ****Lauric-myristic mono-ethanolamide | 2.0 | — | — | — | — |
| Sodium xylene sulfonate | 1.6 | — | — | — | — |
| Sodium isethionate | 5.0 | 5.0 | 5.0 | 5.0 | 5.0 |
| "Hydroxy E.D.T.A." | 0.08 | 0.08 | 0.08 | 0.08 | 0.08 |
| Magnesium sulfate heptahydrate | 1.0 | 1.0 | 1.0 | 1.0 | 1.0 |
| ***Water-soluble protein | 1.0 | 1.0 | 1.0 | 1.0 | 1.0 |
| Ethanol | 6.0 | 6.0 | 6.0 | 6.0 | 6.0 |
| Water | Bal. | Bal. | Bal. | Bal. | Bal. |
| | 100.0 | 100.0 | 100.0 | 100.0 | 100.0 |

*, and * - As in Example 1
**** Produced by reacting one mole of lauric-myristic fatty acid with one mole of monoethanolamine at elevated temperature. The acyl radical has a carbon chain distribution of 1% max. $C_{8-10}$, 71.2±2.0% $C_{12}$, 27.8±2.0% $C_{14}$ and 1% max. $C_{16}$.

It is found that the formulation of Examples 1-7 provide detergent compositions having good foaming power, foam characteristics, detergency, biodegradability, storability, low toxicity, good viscosity, resistance to gel formation and ready redissolution of any gel formed.

Particularly suitable compositions having the above excellent detergent properties contain mixtures of amine oxides and amide foam boosters such as alkanoic acid monoethanolamides and diethanolamides and ethoxylated alkanoic acid monoethanolamides. These amides may be substituted for a portion of the amine oxide, i.e. 20, 40 or 60% of the amine oxide may be replaced by an equivalent weight of one of the foregoing amide foam boosters. Example 3 above illustrates such compositions.

The amide foam boosters are readily available as commercial products. Commercial alkanoic acid monoethanolamides such as MONAMID LM-MA and EMID No. 6504 grade, diethanolamides such as TREPOLINE STD and MONAMID 150 LMW-C and ethoxylated monoethanolamides such as AMIDOX L-1 and AMIDOX C-1 may be used to advantage.

The detergent mixture is generally solubilized in an aqueous medium to form a homogeneous liquid product. This aqueous medium may be water along where the ingredients are soluble therein or it may consists of a mixture of water and an assistant solubilizer selected from the group consisting of $C_2-C_3$ monohydric alcohols and water-soluble salts of organic sulfonated or sulfated hydrotropes containing an alkyl group having up to six carbon atoms and mixtures thereof. Suitable alcohols include ethanol, propanol and isopropanol, with ethanol being preferred. Suitable organic sulfonate hydrotropes include alkyl aryl sulfonates having up to 3 carbon atoms in the alkyl group such as sodium, potassium and ammonium toluene, xylene and cumene sulfonates. Suitable organic sulfate hydrotropes are the $C_5-C_6$ alkyl sulfate sodium, potassium, ammonium or mono-, di- and triethanolammonium salts.

The proportion of the aqueous medium generally will be from about 30 to about 80%, preferably about 40% to 70%, by weight of the liquid detergent. When present, the alcoholic solubilizer concentration will be about 1% to 10%, preferably 3% to 7%, by weight and the hydrotrope concentration will vary from about 0% to 6%, preferably 0.5% to 3% by weight, said weights being based upon the weight of the liquid detergent.

In a preferred embodiment, the liquid detergent compositions will include from 0.25% to 3%, preferably 1% to 2%, by weight of a water-soluble substantive protein to reduce irritation of the skin on the fingers and hands of the user. Chemically, the protein ingredient is a low molecular weight polypeptide obtained by hydrolysis of protein materials such as human and animal hair, horns, hides, hoofs, gelatin, collagen, and the like. During hydrolysis the proteins are gradually broken down into their constituent polypeptides and amino acids by prolonged heating with acids, e.g., sulfuric acid, or alkalis, e.g., sodium hydroxide, or treatment with enzyme, e.g., peptidases. In hydrolysis, high molecular weight polypeptides are formed first and as hydrolysis proceeds there are converted progressively to simpler and simpler polypeptides to tripeptides, dipeptides, and finally to amino acids. It is obvious that the polypeptides derived from proteins are complex mixtures and in practice the average molecular weight of the hydroylsis will vary from 120 (amino acids) to about 20,000. All satisfactory hydrolyzed polypeptides are characterized by water solubility. In compositions which contain soluble protein it is preferred to use hydrolyzed collagen of such low molecular weight as to be completely soluble in water, non-gelling, and non-denaturing with an average molecular weight below 15,000, preferably in the range of about 500 to 10,000 with optimum results occuring at a molecular weight of about 1,000.

The detergent compositions of the present invention may also include other conventional ingredients generally used in such formulations. The preferred compositions of the subject invention are substantially free of builder salts.

Water hardness salts such as magnesium sulfate and calcium chloride may be employed at concentrations of 0.5% to 4% by weight to enhance foaming in soft water. Sequestrants such as alkali metal citrates, gluconates and aminopolycarboxylates may be present in amounts from 0.1% to 1% by weight to sequester metallic ions such as iron found in wash water. Other adjuvants such as brighteners, colorants, emollients, perfumes, bacteriocides and the like may also be added to the detergent composition in concentrations up to about 2% by weight to improve various properties thereof.

The detergent composition may also contain about 1% to 8%, preferably about 2% to 6% e.g. about 4% of a water soluble salt of an organic sulfonic acid, preferably a mono-sulfonic acid having less than 5 carbon atoms e.g. the sodium salt of sulfosuccinic acid (such as trisodium sulfosuccinate), sodium allyl sulfonate or sodium isethionate.

These salts are generally present in the detergent composition in a eight ratio of olefin sulfonate (a) to salt of from about 16:1 to about 2.0:1, preferably from about 7:1 to about 3:1 e.g., about 4:1. The use of such salts in aqueous liquid olefin sulfonate compositions, broadly constitutes an improved aspect of this invention in that it has been found that when the subject salts are incorporated in such olefin compositions, the tendency to form a gel-like skin is reduced and the ability to readily redissolve any gel formed is increased. Other water salts of organic sulfonic acids may also be employed as antigelling ingredients.

In addition to the foregoing ingredients, the liquid detergent compositions may, less preferably, include minor proportions of other surfactants which do not adversely affect the composition's excellent characteristics. Such detergents generally will be present in amounts well below about 10%, preferably below about 5% of the total detergent content of the composition. Such detergents may be any compatible anionic, nonionic, amphoteric, zwitterionic and polar nonionic detergent which achieves good detergency, wetting or lathering characteristics or other advantageous detergent characteristics.

Suitable anionic detergents include the higher alkyl mononuclear aromatic sulfonates such as the higher alkyl benzene sulfonates containing from 10 to 16 carbon atoms in the higher alkyl group in a straight or branched chain, for example, the sodium, potassium and ammonium salts of higher alkyl benzene sulfonates, higher alkyl toluene sulfonates, higher alkyl phenol sulfonates and higher naphthalene sulfonates; paraffin sulfonates containing about 10 to 20 carbon atoms, for example, the primary paraffin sulfonates are made by reacting long-chain alpha olefins and bisulfites and paraffin sulfonates having the sulfonated group distributed along the paraffin chain as shown in U.S. Pat. Nos. 2,503,280, 2,507,088, 3,260,741, 3,372,288 and German Pat. No. 735,096; sodium and potassium sulfates of higher alcohols containing 8 to 18 carbon atoms such as sodium lauryl sulfate and sodium tallow alcohol sulfate; sodium and potassium salts of α-sulfofatty acid esters containing about 10 to 20 carbon atoms in the acyl group, for example, methyl α-sulfomyristate and methyl α-sulfotallowate, ammonium sulfates of mono- or diglycerides of higher ($C_{10}$–$C_{18}$) fatty acids, for example, stearic monoglyceride monosulfate; sodium higher alkyl ($C_{10}$–$C_{18}$) glyceryl ether sulfonates; and sodium or potassium alkyl phenol polyethenoxy ether sulfates with about 1 to 6 oxyethylene groups per molecule and in which the alkyl radicals contain about 8 to about 12 carbon atoms.

Other suitable anionic surface active agents include the $C_8$ to $C_{18}$ acyl sarcosinates (for example sodium lauroyl sarcosinate); sodium and potassium salts of the reaction product of higher fatty acids containing 8 to 18 carbon atoms in the molecule esterified with isethionic acid; and sodium and potassium salts of the $C_8$ to $C_{18}$ acyl N-methyl taurides, for example, sodium cocoyl methyl taurate and potassium stearoyl methyl taurate.

Other types of surface active agents useful in the practice of the present invention are the nonionic synthetic organic detergents which are generally the condensation product of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a nonionic detergent. Further, the length of the polyethenoxy chain can be adjusted to achieve the desired balance between the hydrophobic and hydrophilic elements.

The nonionic detergents include the polyethylene oxide condensate of one mole of alkyl phenol containing from about 6 to 12 carbon atoms in a straight- or branched-chain configuration with about 5 to 30 moles of ethylene oxide, for example, nonyl phenol condensed with 9 moles of ethylene oxide, dodecyl phenol condensed with 15 moles of ethylene and dinonyl phenol condensed with 15 moles of ethylene oxide. Condensation products of the corresponding alkyl thiophenols with 5 to 30 moles of ethylene oxide are also suitable.

Also included in the nonionic detergent class are the condensation products of a higher alcohol containing about 8 to 18 carbon atoms in a straight or branched-chain configuration condensed with about 5 to 30 moles of ethylene oxide, for example, lauryl-myristyl alcohol condensed with about 16 moles of ethylene oxide.

One group of nonionics is marketed under the trade name "Pluronics." The compounds are formed by condensing ethylene oxide with a hydrophobic base formed by the condensation of propylene oxide with propylene glycol. The molecular weight of the hydrophobic portion of the molecule is of the order of 950 to 4,000 and preferably 1,200 to 2,500. The addition of polyoxyethylene radicals to the hydrophobic portion tends to increase the solubility of the molecule as a whole. The molecular weight of the block polymers varies from 1,000 to 15,000, and the polyethylene oxide content may comprise 20% to 80% by weight.

Zwitterionic detergents such as the betaines and sulfobetaines having the following formula are also useful:

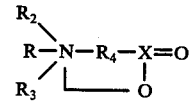

wherein R is an alkyl group containing about 8 to 18 carbon atoms, $R_2$ and $R_3$ are each an alkylene or hydroxyalkylene group containing about 1 to 4 carbon atoms, $R_4$ is an alkylene or hydroxyalkylene group containing 1 to 4 carbon atoms, and X is C or S:O. The alkyl group can contain one or more intermediate linkages such as amido, ether, or polyether linkages or nonfunction substituents such as hydroxyl or halogen which do not substantially affect the hydrophobic character of the group. When X is C, the detergent is called a betaine; and when X is S:O, the detergent is called a sulfobetaine or sultaine. Preferred betaine and sulfobetaine detergents are 1-(lauryl dimethylammonio) acetate 1-(myristyl dimethylammonio) propane-3-sulfonate, and 1-(myristyldimethylammonio)-2-hydroxy-propane-3-sulfonate.

The polar nonionic detergents are those in which the hydrophilic group contains a semi-polar bond directly between two atoms, for example, As→O and S→O. There is charge separation between the two directly bonded atoms, but the detergent molecule bears no net charge and does not dissociate into ions.

Operable polar nonionic detergents include the open-chain aliphatic phosphine oxides having the general formula $R_1R_2R_3P\rightarrow O$ wherein $R_1$ is an alkyl, alkenyl, or monohydroxyalkyl radical ranging in chain length from 10 to 18 carbon atoms, and $R_2$ and $R_3$ are each alkyl and monohydroxyalkyl radicals containing from 1 to 3 carbon atoms.

Examples of suitable ampholytic detergents include the alkyl beta-aminopropionates, RN(H)C₂H₄COOM; the alkyl beta-iminodipropionates, RNC₂H₄SO₃M; and the long-chain imidazole derivatives having the following formulas:

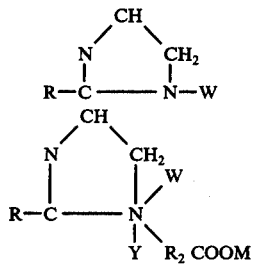

wherein R is an acyclic group of about 7 to 17 carbon atoms, W is selected from the group of R₂OH, R₂COOM, and R₂OR₂COOM, Y is selected from the group consisting of OH⁻, R₃OSO₃⁻, R₂ is an alkylene or hydroxyalkylene group containing 1 to 4 carbon atoms, R₃ is selected from the group consisting of alkyl, alkyl aryl and fatty acyl glyceride groups having 6 to 18 carbon atoms in the alkyl or an acyl group; and M is a water-soluble cation, for example, sodium, potassium, ammonium, for alkylolammonium.

Formula I detergents are disclosed in Volume II of "Surface Active Agents and Detergents" and Formula II detergents are described in U.S. Pat. Nos. 2,773,068; 2,781,354; and 2,781,357. The acyclic groups may be derived from coconut oil fatty acids (a mixture of fatty acids containing 8 to 18 carbon atoms), lauric fatty acid, and oleic fatty acid, and the preferred groups are C₇ to C₁₇ alkyl groups. Preferred detergents are sodium N-lauryl beta-aminopropionate, disodium N-lauryl iminodipropionate, and the disodium salt of 2-laurylcycloimidium-1-hydroxyl, 1-ethoxyethanoic acid, 1-ethanoic acid.

Although the present invention has been described with reference to particular embodiments and Examples, we wish it to be understood that we do not desire to be limited to the exact detail of such embodiments for obvious modification will occur to a person skilled in the art.

What is claimed is:

1. A light duty liquid detergent composition consisting essentially of about 18% to 40% by weight of a mixture of at least one water-soluble salt of a sulfonate alpha olefin containing about 12 to 18 carbon atoms and at least one water-soluble salt of an ethoxylated alkyl sulfate containing an alkyl group of 10 to 18 carbon atoms and from 1 to 5 ethenoxy groups, the weight ratio of olefin sulfonate to alkyl sulfate being from about 1.4:1 to about 1.1:1, about 1.5% to about 10% by weight of an amine oxide foam booster selected from the group consisting of tertiary amine oxides having the formula

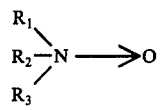

wherein R₁ is a higher alkyl group containing about 12 to 18 carbon atoms and R₂ and R₃ are radicals selected from the group consisting of alkyl and hydroxyalkyl groups having 1 to 4 carbon atoms, morpholino oxides having the formula

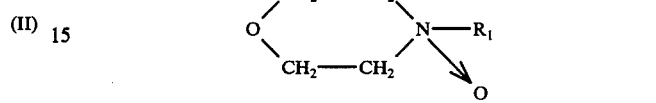

wherein R₁ is a higher alkyl group containing about 12 to 18 carbon atoms and mixtures thereof, and about 1% to 8% by weight of sodium allyl sulfonate in an aqueous medium.

2. The liquid detergent composition of claim 1 wherein a C₁₂–C₁₄ alkanoic acid amide foam booster selected from the group consisting of alkanoic acid monoethanolamide, alkanoic acid diethanolamide and ethoxylated alkanoic aicd monoethanolamide is substituted for up to 60% by weight of the amine oxide foam booster.

3. The liquid detergent composition of claim 1 wherein the weight of olefin sulfonate to alcohol sulfate is from about 1.3:1 to about 1.1:1

4. The liquid detergent composition of claim 1 which further includes from about 0.25% to about 3% by weight of a water soluble protein hydrolysate having a molecular weight of from about 120 to about 20,000.

5. The liquid detergent composition of claim 4 wherein said protein hydrolysate is derived from collagen and has a molecular of from 500 to 10,000 and is present in the amount of from about 1% to 2% by weight of the detergent composition.

6. The liquid detergent composition of claim 1 wherein the olefin sulfonate has an average of about 14 to 16 carbon atoms and is produced by sulfonating an olefin mixture containing about 75 to 85% by weight straight chain alpha olefin, about 8 to 20% by weight vinylidene olefin and about 5 to 12% by weight internal straight chain olefin, with sulfur trioxide in a molar ratio of olefin mixture to sulfur trioxide of about 1:1 to 1.2:1 and subsequently neutralizing the sulfonated mixture and converting sultones therein to sulfonic acids by ring-opening.

7. The liquid detergent composition of claim 1 wherein the aqueous medium is water or a mixture of water and a solubilizer selected from the group consisitng of 1% to 10% by weight of C₂–C₃ monohydric alcohols, 0% to 6% by weight of a sodium, potassium, ammonium, or mono-, di- or triethanolammonium salt of a C₁–C₃ alkyl substituted benzene sulfonate or C₅–C₆ alkyl sulfate and mixtures thereof.

8. The liquid detergent composition of claim 7 wherein said mixture is about 25% to 35% by weight and the amine oxide foam booster is about 2% to 8% by weight.

9. The liquid detergent composition of claim 1 which further includes about 0.5% to 4% by weight of magnesium sulfate heptahydrate.

* * * * *

UNITED STATES PATENT OFFICE   Page 1 of 2
CERTIFICATE OF CORRECTION

Patent No. 4,064,076             Dated   December 20, 1977

Inventor(s)  Stephen C. Klisch and Charles A. Martin

It is certified that error appears in the above-identified patent and that said Letters Patent are hereby corrected as shown below:

In Column 4, line 23 change:

"*" to --**--

In Column 4, line 23 change:

"trietrexamer" to --triethoxamer--

In Column 5, line 41 change:

"along" to --alone--

In Column 6, line 27 change:

"there" to --these--

UNITED STATES PATENT OFFICE
CERTIFICATE OF CORRECTION

Patent No. 4,064,076　　　　　Dated　December 20, 1977

Inventor(s) Stephen C. Klisch and Charles A. Martin

It is certified that error appears in the above-identified patent and that said Letters Patent are hereby corrected as shown below:

In Column 7, line 33 change:

"3,372,288" to --3,372,188--

In Column 10, line 27 change:

"aicd" to --acid--

Signed and Sealed this

Twentieth Day of June 1978

[SEAL]

Attest:

RUTH C. MASON
Attesting Officer

DONALD W. BANNER
Commissioner of Patents and Trademarks